(12) United States Patent  
Mucha et al.

(10) Patent No.: US 8,661,116 B2
(45) Date of Patent: Feb. 25, 2014

(54) NETWORK TESTING

(75) Inventors: Daniel E. Mucha, Garland, TX (US); Richard Moczygemba, Garland, TX (US); Luay Jalil, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 346 days.

(21) Appl. No.: 12/334,964

(22) Filed: Dec. 15, 2008

(65) Prior Publication Data

US 2010/0153055 A1   Jun. 17, 2010

(51) Int. Cl.
  *G06F 15/173*   (2006.01)
(52) U.S. Cl.
  USPC .......................................... 709/224; 709/223
(58) Field of Classification Search
  USPC ............... 709/220, 221, 224, 240; 714/4, 11
  See application file for complete search history.

(56) References Cited

U.S. PATENT DOCUMENTS

| | | | | |
|---|---|---|---|---|
| 5,450,592 A * | 9/1995 | McLeod | ....................... | 718/104 |
| 6,269,076 B1 * | 7/2001 | Shamir et al. | ................. | 370/217 |
| 6,397,359 B1 * | 5/2002 | Chandra et al. | ............... | 714/712 |
| 6,681,232 B1 * | 1/2004 | Sistanizadeh et al. | ................ | 1/1 |
| 6,801,940 B1 * | 10/2004 | Moran et al. | .................. | 709/224 |
| 6,971,044 B2 * | 11/2005 | Geng et al. | ....................... | 714/11 |
| 7,200,865 B1 * | 4/2007 | Roscoe et al. | .................. | 726/12 |
| 7,222,255 B1 * | 5/2007 | Claessens et al. | ........... | 714/4.12 |
| 7,281,167 B2 * | 10/2007 | Dube | .............................. | 714/39 |
| 7,409,460 B1 * | 8/2008 | Li | ................................. | 709/240 |
| 7,535,851 B2 * | 5/2009 | Dube et al. | ..................... | 370/252 |
| 7,596,373 B2 * | 9/2009 | McGregor et al. | ............ | 455/425 |
| 7,599,283 B1 * | 10/2009 | Varier et al. | .................. | 370/216 |
| 2002/0124064 A1 * | 9/2002 | Epstein et al. | ................ | 709/221 |
| 2003/0130832 A1 * | 7/2003 | Schulter et al. | ................. | 703/23 |
| 2004/0088386 A1 * | 5/2004 | Aggarwal | ..................... | 709/220 |
| 2005/0022189 A1 * | 1/2005 | Proulx et al. | .................. | 718/100 |
| 2005/0050190 A1 * | 3/2005 | Dube | ........................... | 709/223 |
| 2005/0097185 A1 * | 5/2005 | Gibson et al. | ................. | 709/217 |
| 2006/0107108 A1 * | 5/2006 | Geng et al. | ..................... | 714/11 |
| 2007/0076616 A1 * | 4/2007 | Ngo et al. | ..................... | 370/241 |
| 2007/0223388 A1 * | 9/2007 | Arad et al. | .................... | 370/252 |
| 2008/0239943 A1 * | 10/2008 | Hauenstein et al. | .......... | 370/216 |
| 2009/0199290 A1 * | 8/2009 | McCullough et al. | .......... | 726/12 |

* cited by examiner

Primary Examiner — Tae Kim

(57) ABSTRACT

A method may include receiving, at a first network device, a test initiation message from a control device, wherein the test initiation message includes at least an identification of a second network device. The method may further include retrieving the identification of the second network device from the test initiation message and generating test data including at least source information associated with the first network device, destination information associated with the second network device, and timestamp information associated with a time at which the test data is generated. In addition, the method may include transmitting the test data to the second network device via a data network under test and receiving return test data from the second network device. Further, the method may include generating performance information based on the return test data received from the second network device.

13 Claims, 12 Drawing Sheets

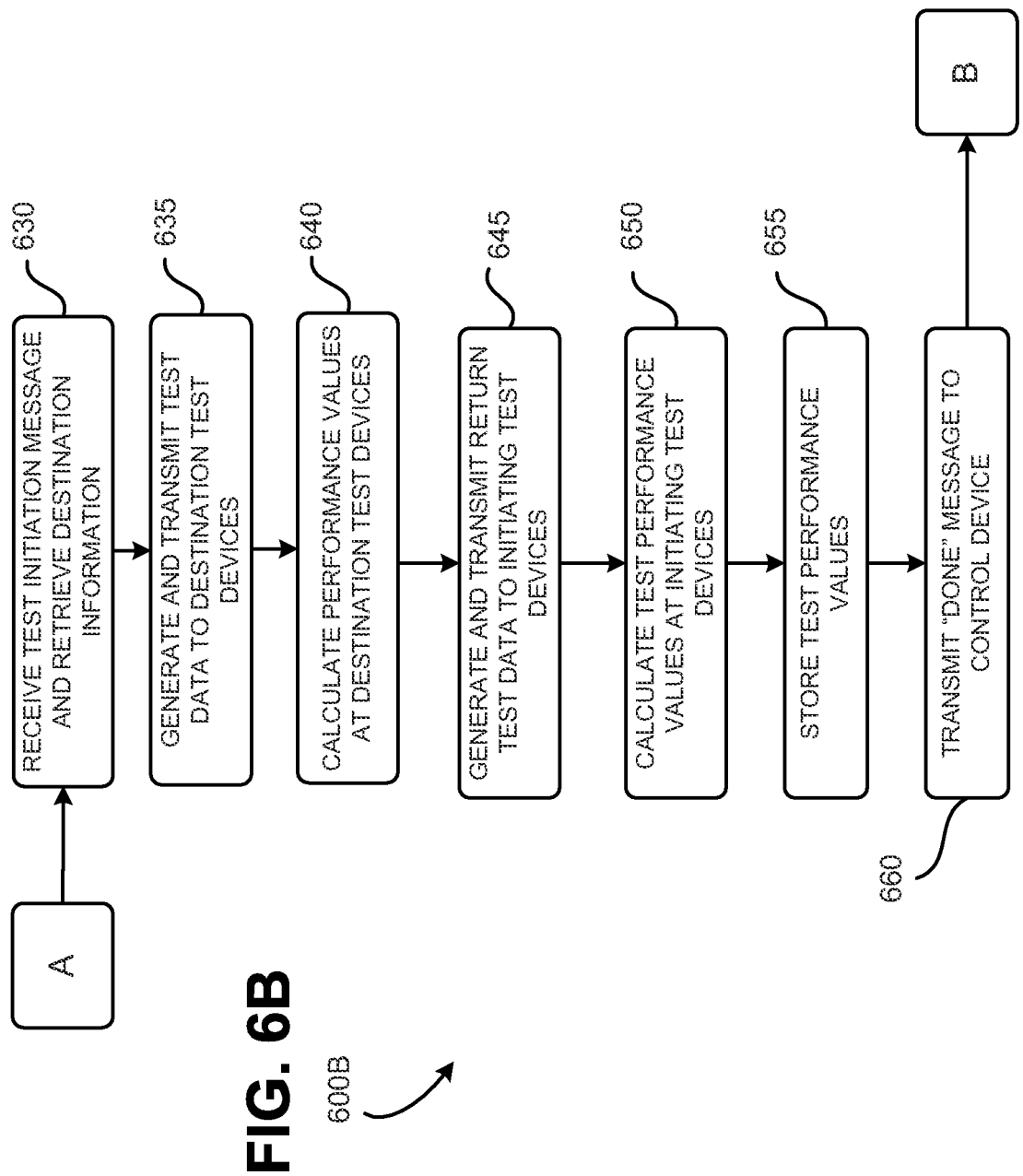

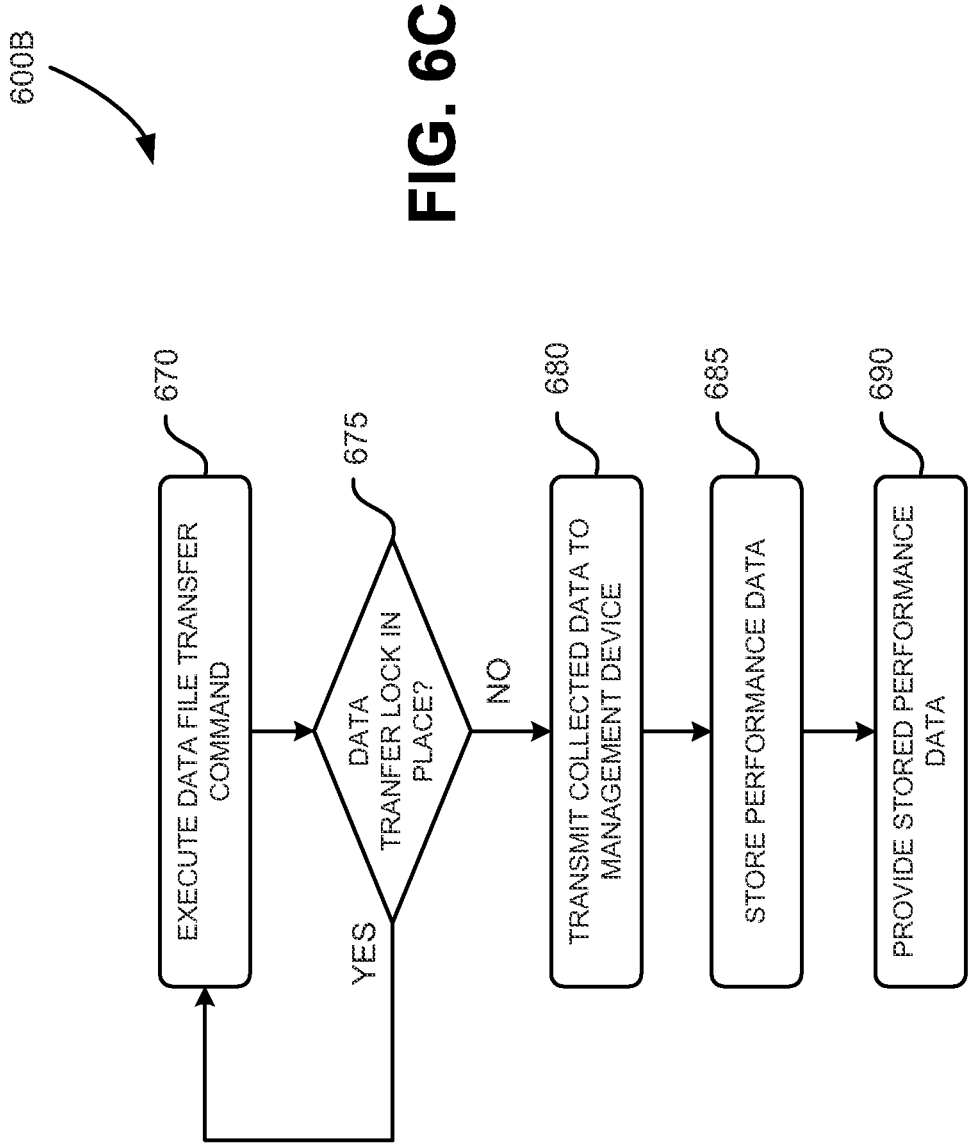

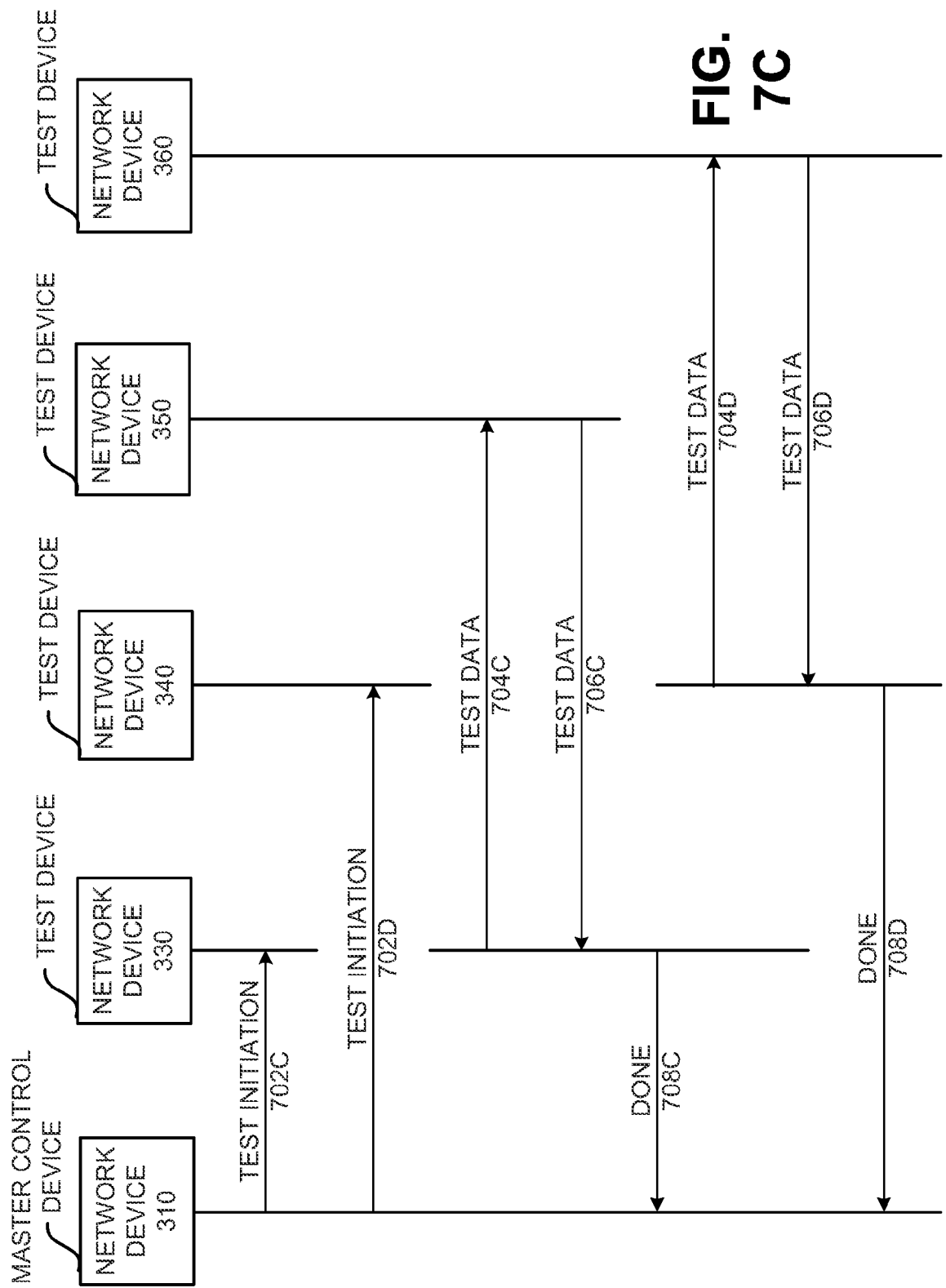

NETWORK TESTING

BACKGROUND INFORMATION

Processing and routing data, calls, etc., in a network has become increasingly complex due to increased overall traffic and customer bandwidth requirements. In some instances, a customer may enter into a service level agreement (SLA) with a provider that guarantees the customer an agreed level of service. As a result, a provider may test network conditions to determine whether the terms of the SLA are met. For example, a service provider may generate and route test traffic at various times to determine performance metrics related to the SLA.

BRIEF DESCRIPTION OF THE DRAWINGS

FIGS. 6A through 6C are flowcharts of an exemplary process for testing a data network; and FIGS. 7A through 7D are diagrams of exemplary network signals for the exemplary process of FIGS. 6A and 6B.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to a network test environment that provides for testing network parameters, such as latency, jitter, packet loss, reorder or sequencing, and Mean Opinion Score (MOS), among others. The test architecture may include a master control device that communicates with other test devices to control the testing. In some instances, backup (e.g., non-master) control devices may provide control in the event that the master control device experiences problems. The testing may also use virtual local area network (VLAN), asynchronous transfer mode (ATM), frame relay (FR), multi-protocol label switching (MPLS), or any other technology to enable point-to-point (e.g., network device to network device) testing to be accomplished in an efficient manner regardless of the protocols or customer interfaces being used.

Figure 1:
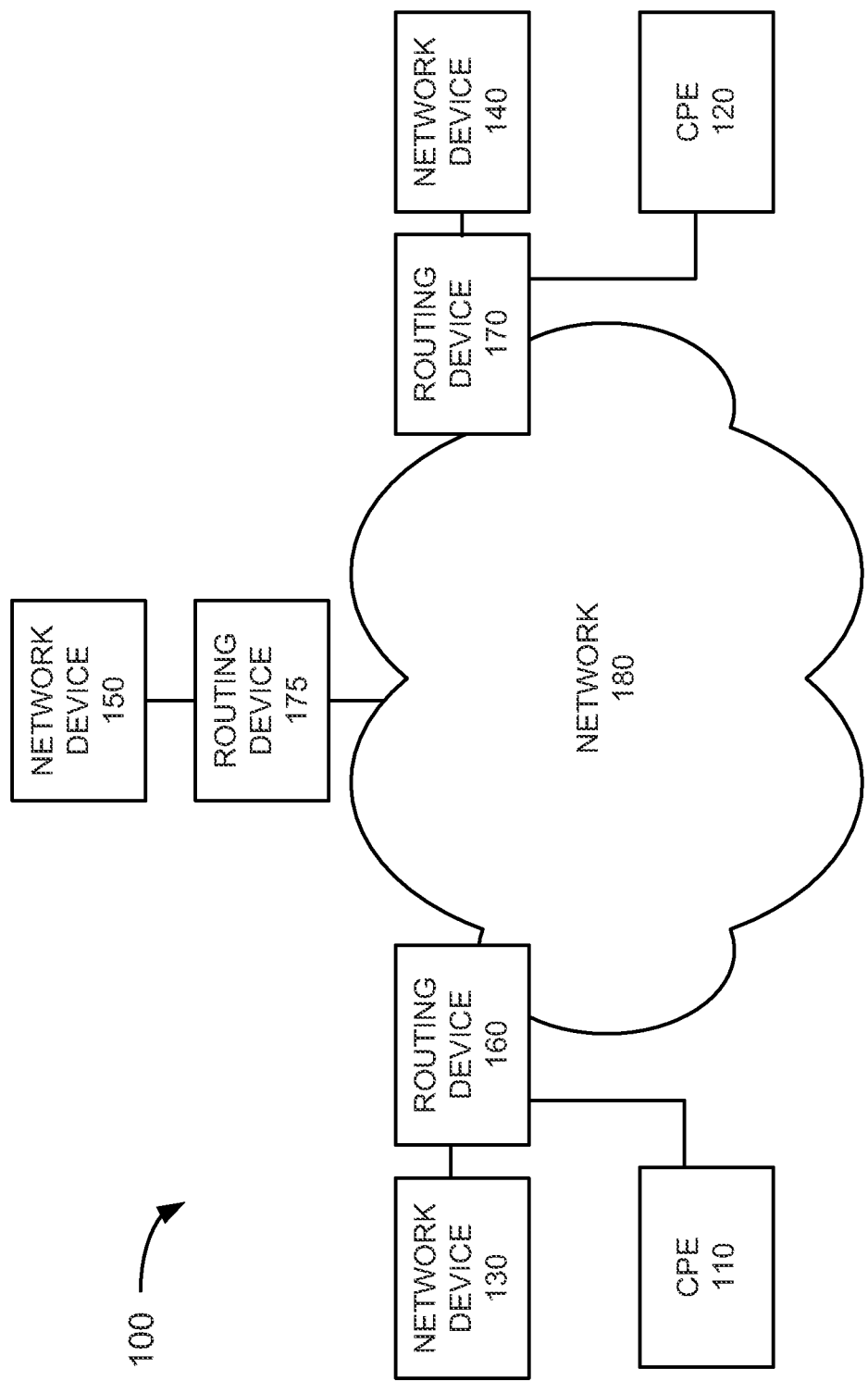
FIG. 1 illustrates an exemplary network in which systems and methods described herein may be implemented.

FIG. 1 is a block diagram of an exemplary network 100 in which systems and methods described herein may be implemented. Network 100 may include customer premises equipment (CPE) 110, CPE 120, network devices 130, 140, and 150, routing devices 160, 170, and 175, and network 180.

CPEs 110 and 120 may represent any customer provided equipment, such as a telephone system (e.g., a private branch exchange (PBX), a voice over Internet protocol (VoIP) system), one or more servers, one or more routers, a network, such as a local area network (LAN) or wide area network (WAN) associated with a customer, or other devices/systems associated with a customer. CPE 110 and CPE 120 may transmit data to and receive data from network 180 via any number of protocols, such as Ethernet, Gigabit Ethernet, optical carrier level 3 (OC3), OC12, Frame Relay, asynchronous transfer mode (ATM), the Internet Protocol (IP), etc.

CPE 110 and CPE 120 may be associated with the same customer or different customers. For example, CPE 110 and CPE 120 may represent origination and destination devices associated with a dedicated private communication service between CPE 110 and CPE 120, such as a private Internet protocol (PIP) based network, that may be provided by a service provider associated with network 180. Alternatively, CPE 110 and CPE 120 may represent different entities/customers that are provided with shared or dedicated communication services provided by a service provider associated with network 180. In some implementations, CPE 110 and CPE 120 may each represent a switch, a router, a gateway, etc., that receives data and routes the data via network 180 to a destination device.

Network devices 130, 140, and 150 may include one or more devices used to test and measure parameters associated network 180. For example, network devices 130 and 140 may include measurement logic that is able to measure latency, jitter, packet loss, reorder, MOS, and/or other parameters associated with routing data through network 180 (e.g., simulating traffic from/to CPEs 110 and 120 via network 180). Latency measurements may include the time it takes a packet to travel from a source end-point to the destination end-point and. Jitter measurements may include the variation of the latency over a period of time. Packet loss measurements may include the number or percentage of packets sent from one end-point that do not arrive at the other end-point. Reorder or sequencing measurements include an indication of the number or percentage of packets arriving at an end-point in a different order than they were sent. MOS measurements include a calculation of voice quality of voice in the packets. MOS may inherently be based on and/or dependent on latency, packet loss, reorder, and/or jitter. This measurement information may then be used to determine whether the network meets SLA requirements or other customer requirements.

In one embodiment, one or more of network devices 130-150 may include a control device to control the testing and measuring of parameters associated with network 180. For example, network device 150 may act as a control device to control network devices 130 and 140 for testing network 180.

CPEs 110 and 120 and network devices 130-150 may connect to each other and network 180 via wired, wireless or optical communication mechanisms. For example, CPE 110 may connect to network device 130 via an Ethernet network, the public switched telephone network (PSTN), a wireless network, the Internet, or some other mechanism.

Routing devices 160, 170, and 175 may include one or more elements, such as switches, gateways, routers, etc., used to route data in network 180. For example, in one implementation, routing devices 160, 170, and 175 may each include a router coupled to network devices 130, 140, and 150, respectively, to allow network devices 130, 140, and 150 to inject test data into network 180. The test data may be used to measure network parameters (e.g., latency, jitter, packet loss, reorder, MOS, etc.). Routing devices 160, 170, and 175 may include provider edge (PE) devices that route data using multi-protocol label switching (MPLS). Routing devices 160 and 170 may route data associated with a particular customer (e.g., from CPE 110 to CPE 120, for example). In this case, the provider associated with network 180 may set up label switching paths (LSPs) in network 180 to route data.

Network 180 may include one or more wired and/or wireless networks that are capable of receiving and transmitting data, voice and/or video signals, including multimedia signals that include voice, data and video information. For example, network 180 may include one or more public switched telephone networks (PSTNs) or other type of switched network. Network 180 may also include one or more wireless networks and may include a number of transmission towers for receiving wireless signals and forwarding the wireless signals toward the intended destinations. Network 180 may further include one or more packet switched networks, such as an Internet protocol (IP) based network, a local area network (LAN), a wide area network (WAN), a personal area network (PAN), an intranet, the Internet, or another type of network that is capable of transmitting data. In an exemplary implementation, network 180 may include devices configured as a virtual local area network (VLAN) to facilitate testing network 180, as described below.

Network 180 may include one or more high-speed data networks, such as a very high performance backbone network services (vBNS) network. In an exemplary implementation, network 180 may also include a private IP (PIP) or MATRIX network used to route data. In an exemplary implementation, network 180 may include an MPLS network.

The exemplary configuration illustrated in FIG. 1 is provided for simplicity. Network 100 may include more or fewer devices than illustrated in FIG. 1. For example, network 100 may include additional elements, such as switches, gateways, routers, CPE components, etc., that aid in routing traffic, such as telephone calls, data, etc., from CPE 110 and CPE 120 to their respective destinations in network 100. Network devices 130, 140, and 150 and routing devices 160, 170, and 175 are shown as separate devices. In other implementations, the functions performed by multiples devices may be performed by a single device. For example, in some implementations, the functions described as being performed by network device 130 and routing device 160 may be performed by a single device.

Figure 2:
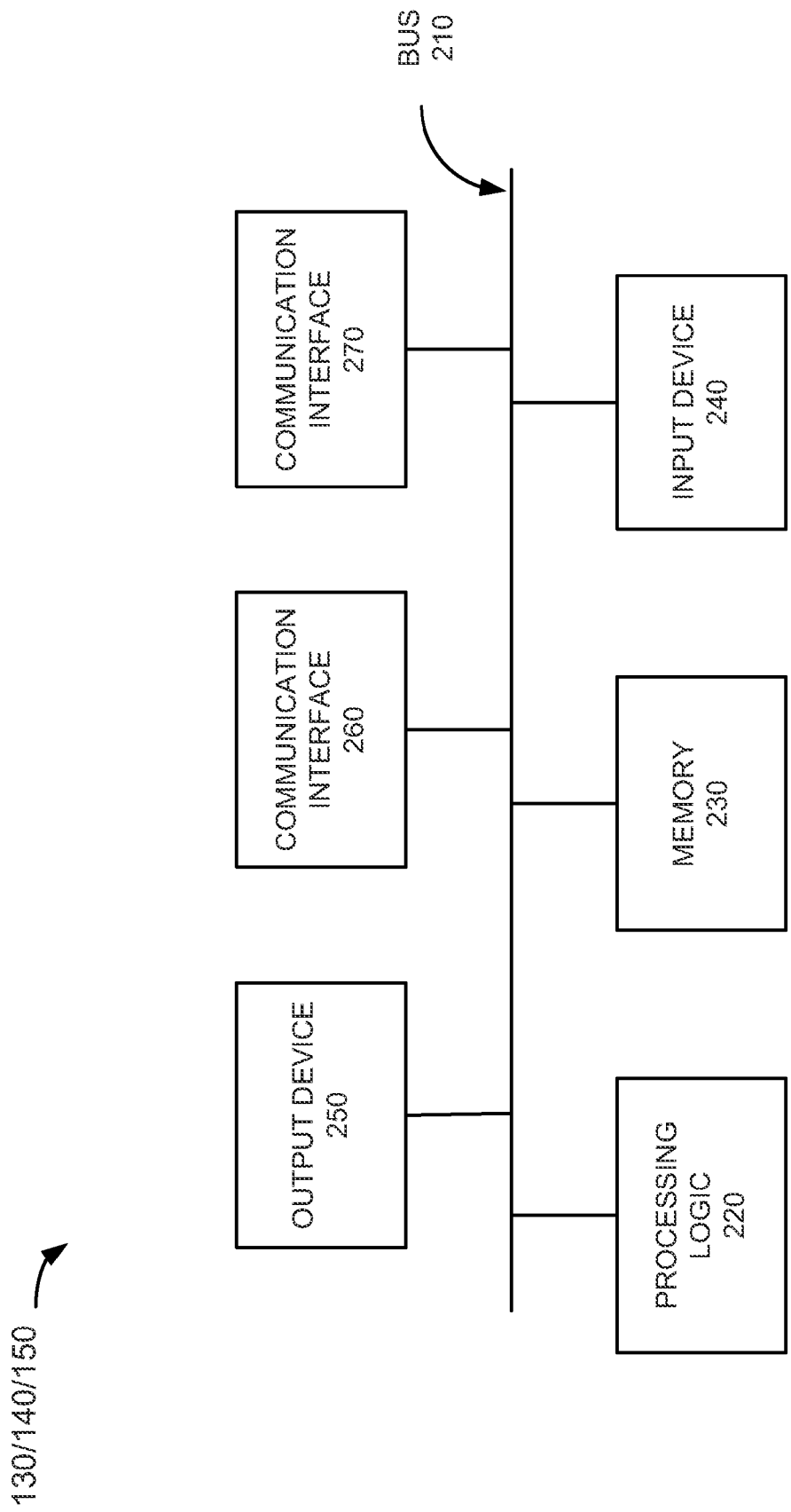
FIG. 2 illustrates an exemplary configuration of components implemented in the network devices of FIG. 1.

FIG. 2 illustrates an exemplary configuration of network device 130. Network devices 140 and 150 may be configured in a similar manner. Referring to FIG. 2, network device 130 may include a bus 210, processing logic 220, a memory 230, an input device 240, an output device 250, a communication interface 260 and a communication interface 270. Network device 130 may include other components (not shown) that aid in receiving, transmitting, and/or processing data. Moreover, other configurations are possible.

Bus 210 may permit communication among the components of network device 130. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for processing logic 220, and/or some other type of magnetic or optical recording medium and its corresponding drive for storing information and/or instructions.

Input device 240 may include a device that permits an operator to input information to network device 130, such as a keyboard, a keypad, a mouse, a pen, a microphone, etc. Output device 250 may include a device that outputs information to the operator, such as a display, a speaker, etc. In one embodiment, network devices 130, 140, and 150 may, for example, be "headless" and not include a keyboard or a display.

Communication interfaces 260 and 270 may include any transceiver-like mechanism that enables network device 130 to communicate with other devices and/or systems. For example, communication interfaces 260 and 270 may include a modem or an Ethernet interface for communicating with other devices in network 100 via, for example, network 180. In an exemplary implementation, communication interface 260 may include mechanisms for communicating with other components within network 100, such as PIP data networks that are included in network 180. Further, communication interface 270 may include mechanisms for communicating with other components within network 100, such as a vBNS network that is included in network 180.

As described above, network devices 130-150 may be used to test parameters associated with customers, such as customers represented by CPEs 110 and 120. In an exemplary implementation, a number of network devices, such as network devices 130-150 may be deployed in network 100 to test performance of network 180 for many customers using network 180.

Figure 3:
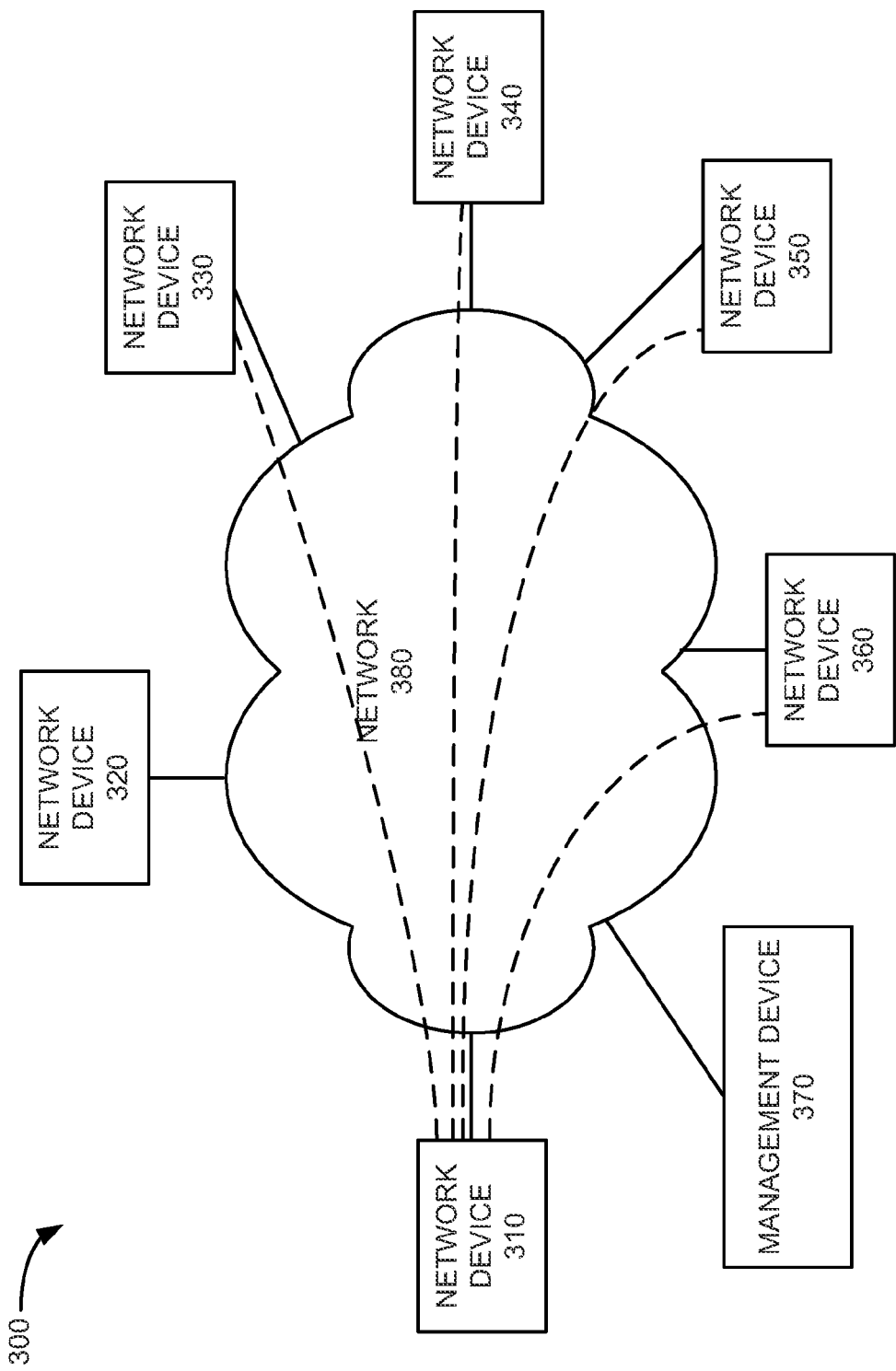
FIG. 3 illustrates another exemplary network in which systems and methods described herein may be implemented.

For example, FIG. 3 illustrates an exemplary network 300 in which systems and methods described herein may be implemented. Referring to FIG. 3, network 300 may include network devices 310-360, management device 370 and network 380. In this exemplary implementation, network devices 310-360 may correspond to network devices 130, 140, and 150 described above with respect to FIG. 1. In addition, network devices 310-360 may be configured in a similar manner as network device 130 illustrated in FIG. 2.

The exemplary configuration illustrated in FIG. 3 is provided for simplicity. Network 300 may include more or fewer devices than illustrated in FIG. 3. For example, network 300 may include switches, gateways, routers, etc., that are used to route data in network 300. As an example, one or more of network devices 310-360 may be coupled to a routing device similar to routing devices 160, 170, and 175 described above with respect to FIG. 1.

In one embodiment, one or more of network devices 310-360 may be capable of acting as control devices to control testing of network 380. In the examples discussed below, network devices 310-330 may each be capable of acting as a control device. Although network devices 310-330 may each be capable of acting as a control device, in one embodiment, only one of them (e.g., network device 310) may be the current, active control device (e.g., the master control device). In this embodiment, one of the network devices may be the master control device (e.g., network device 310) while the others (e.g., network devices 320 and 330) are non-master control devices. If the master control device stops functioning, for example, then its status becomes unavailable and one of the non-master control devices may become the master control device.

One or more of network devices 310-360 may also act as test devices that inject test data into network 380 to test network parameters. Tested network parameters may include latency, packet loss, jitter, reorder, MOS, etc. In the examples discussed below, network devices 330-360 may act as test devices to test network 380. In one embodiment, a network device (e.g., network device 330) may be capable of acting as both a control device and a test device.

In one embodiment, the control device (e.g., network device 310) may communicate with the other network devices (e.g., network devices 320-360) through a network other than the network under test (e.g., other than network 380). In this embodiment, the control device may communicate with the other network devices through a parallel, out-of-band network. Further, in this embodiment, the control device may not perform the functions of a test device.

The control devices (e.g., network devices 310-330) may be arranged according to rank. In one embodiment, the rank may be based on IP addresses, each of which may be considered "lower" or "higher" than another IP address. As described below, a ranking may be used to elect a new master control device should the current master control device cease to function, for example.

Management device 370 may store results of tests and/or test data. For example, after a test has been conducted, test data associated with the test may be sent to management device 370 for storage in a database. Management device 370 may communicate with network devices 310-360 through a network other than the network under test (e.g., network 380). In this embodiment, management device 370 may communicate with network devices 310-360 through a parallel, out-of-band network. Further, in this embodiment, management device 370 does not perform the functions of a test device.

Network 380 may represent a network used to route customer traffic to/from devices in network 300, such as CPEs (not shown). In an exemplary implementation, network 380 may correspond to network 180 described above with respect to FIG. 1. Network 380 may include a PIP, vBNS, or MATRIX network to route data. In an exemplary implementation, network 380 may include an MPLS network.

In one embodiment, network devices 310-360 may each include one or more physical interfaces that each includes multiple sub-interfaces. For example, in one implementation, an interface in each of network devices 310-360 may include nine logical sub-interfaces, where each sub-interface may connect to another one of network devices 310-360 via a VLAN (e.g., a point-to-point connection or a virtual wire). As an example, network device 310 may include a first sub-interface for connecting to a sub-interface on network device 340, as illustrated by the dotted line in FIG. 3. A second sub-interface on network device 310 may connect to a sub-interface on network device 350, a third sub-interface on network device 310 may connect to a sub-interface on network device 360, and a fourth sub-interface on network device 310 may connect to a sub-on interface on network device 360, as also illustrated by the dotted lines in FIG. 3.

VLANs implemented in network 380 may allow each one of network devices 310-360 to have connections (e.g., virtual wires) to other ones of network devices 310-360. In other words, in one embodiment, network devices 310-360 may each be interconnected to other network devices 310-360 in a VLAN mesh configuration. In addition, including multiple sub-interfaces for each physical interface (e.g., a Gigabit Ethernet (GigE) interface) may allow the mesh to be expanded as additional network devices are added to network 300.

Figure 4:
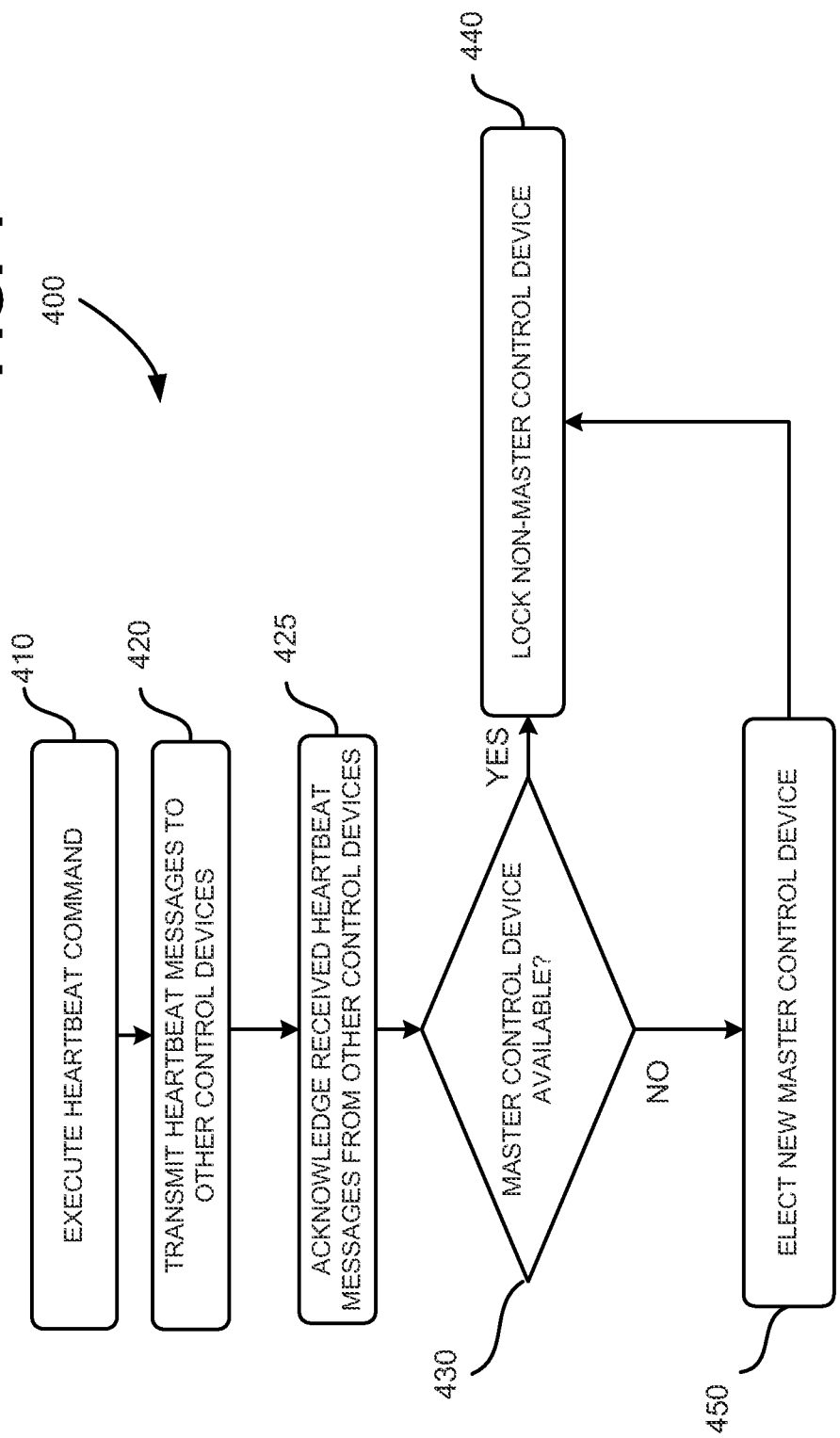
FIG. 4 is a flowchart of an exemplary process for determining a master control device from among a group of control devices.

FIG. 4 is a flowchart of an exemplary process 400 for determining a master control device from among a group of control devices (e.g., network devices 310-330). Process 400 may execute in each control device (e.g., network devices 310-330). Process 400 may begin upon execution of a heartbeat polling command (block 410). In one implementation, a heartbeat polling command may execute periodically based on system settings and requirements. The period may include, for example, a 30 minute period, a 15 minute period, a 10 minute period, a 5 minute period, or a 1 minute period. A heartbeat polling command may be executed periodically using a scheduling program. For example, the "crontab" command in a Linux® or Unix® operating system may be used to schedule periodic execution. In one embodiment, the heartbeat process may continuously run as a daemon process, which may allow it to listen for and respond to any heartbeat messages, as described below, received at any time, for example. The heartbeat daemon may be started using the "inittab" or "event.d" files, for example, in a Linux or Unix operating system.

Upon execution of the heartbeat polling command, the control device (e.g., any of network devices 310-330) may transmit a heartbeat message to each of the other control devices (block 420), effectively informing the other control devices of its status (e.g., available or unavailable). In one implementation, a heartbeat message may include a simple announcement to indicate that the sending device is "alive" and that it is not offline or otherwise unavailable. Additionally, the heartbeat message may include an indication as to whether the sending device is the master control device or, if not, the identity of the sending device's master control device and the time since it last communicated with its master control device.

Figure 5:
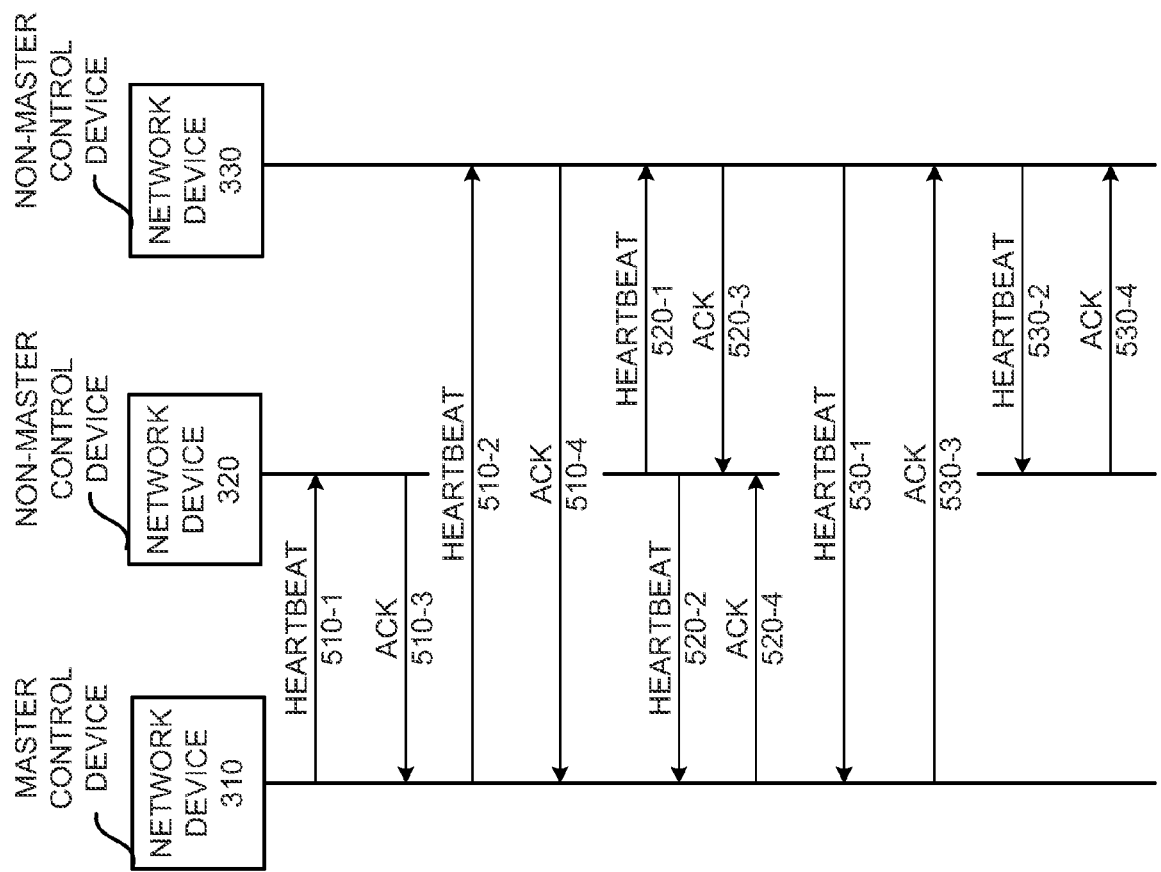
FIG. 5 is a diagram of exemplary network signals for the exemplary process of FIG. 4.

FIG. 5 is a diagram of exemplary network signals for exemplary process 400. In the example of FIG. 5, network device 310 is the master control device, and network devices 320 and 330 are the other, non-master control devices. As shown in FIG. 5, the master control device (network device 310) may send a heartbeat signal 510-1 to network device 320 and a heartbeat signal 510-2 to network device 330. Because process 400 may execute in each control device, whether a master control device or not, network device 320 may also send a heartbeat signal 520-1 to network device 330 and a heartbeat signal 520-2 to network device 310. In addition, network device 330 may send a heartbeat signal 530-1 to network device 310 and a heartbeat signal 530-2 to network device 320.

The control device (e.g., any of network devices 310-330) may also transmit an acknowledgement signal in response to any received heartbeat signals (block 425). An acknowledgement signal may also indicate that a network device is available. In the example of FIG. 5, the master control device (network device 310) may send an acknowledgement signal 520-4 to network device 320 in response to receiving heartbeat signal 520-2. The master control device (network device 310) may also send an acknowledgement signal 520-4 to network device 330 in response to receiving heartbeat signal 530-1. Because process 400 may execute in each control device, network device 320 may also send an acknowledgement signal 510-3 to network device 310 and an acknowledgement signal 530-4 to network device 330. In addition, network device 330 may send an acknowledgement signal 510-4 to network device 310 and an acknowledgement signal 520-3 to network device 320.

Whether or not the master control device is available or not may be determined (block 430). For example, if a heartbeat message or an acknowledgement message has been received from the master control device (network device 310), then the non-master control devices (network devices 320 and 330) may determine that the status of the master control device is available (e.g., still functioning properly). Returning to FIG. 5, for example, network devices 320 and 330 (the non-master control devices) may interpret heartbeat signals 510-1 and 510-2 and/or acknowledgement signals 520-4 and 530-3 to mean that the master control device (network device 310) is available. In this case, a new master control device does not need to be elected from the non-master control devices.

If the master control device is available (block 430-YES), the non-master control device may be locked (or the lock may be maintained) to prevent execution of any control operations (block 440). Absent such a locking operation, multiple testing efforts may be undertaken simultaneously by the control devices, which may result in potentially adverse testing conditions. For example, network devices 320 and 330 (the non-master control devices) may each lock themselves to prevent a process from running that performs control operations.

In one exemplary implementation, the locking operation may include writing a control lock file to a known location in a file system or, alternatively, maintaining an existing lock file in place. In another embodiment, semaphores may be used as a locking mechanism. As described below, in relation to FIG. 6A, control operations may only execute in the absence of the control lock file.

If the master control device is not available (block 430-NO), a new master control device may be elected from the available non-master control devices (block 450). Returning to FIG. 5, for example, if network devices 320 and 330 do not receive heartbeat signals 510-1 and 510-2 or acknowledgement signals 520-4 or 530-3, then each of network devices 320 and 330 may determine that the master control device (network device 310) is not available (e.g., is not functioning properly). In addition, network devices 320 and 330 may each know that the other is available based on heartbeat signals 520-1 and 520-2 or acknowledgement signals 520-3 and 430-4. In this example, then, both network device 320 and network device 330 are available to be elected as a new master control device.

If there are more than one available non-master control devices, as in this example, then the available control device with the highest rank may be declared the newly elected master control device. For example, as discussed above, the control device with the highest IP address may have the highest rank. Thus, if network device 320 has a higher IP address than network device 330, then each device will understand that network device 320 will become the newly elected master control device. In this example, both network device 320 and 330 may be aware of their own and each other's IP addresses. If there is only one available non-master control device, on the other hand, then that non-master control device may elect itself as the new master control device.

After electing a new master control device (block 450), the non-elected network device may be locked (block 440) (or the lock may be maintained) to prevent execution of control operations.

In one embodiment, a master control device may not be determined to be unavailable until a valid heartbeat message and/or acknowledgement message has not been received from the master control device for a number of polling periods (e.g., three periods). In this embodiment, a single missed or lost heartbeat or acknowledgement message may not result in the election of a new master control device.

The heartbeat message may take various forms. For example, in one embodiment, the heartbeat message may indicate the control device that the sending device believes to be the master, the time since the sender last received a message from that master, and a list of other available control devices. A list of other available control devices (also referred to as peers) may allow a new control device attached to network 380 and learn of other control devices and the other control devices to learn of the new control device.

Other variations to process 400 are possible. For example, each control device may also monitor the availability of the non-master control devices, not just the master control device. When a non-master control device becomes unavailable, for example, the control device running process 400 may remove it from its list of available peers (e.g., list of available control devices). Each control device may also keep track of the master device that each peer believes to be the master control device (e.g., as part of its list of peers). When a control device receives a heartbeat message, it may update the list of peers and corresponding master devices.

Variations are also possible regarding the way the master control device is determined when forming a heartbeat message. For example, if a control devices does not indicate a master (e.g., the master has timed out), then the control device may traverse its list of peers and accept the master of one of its peers (e.g., the first peer in the list). If the newly determined master is in the control device's peer list, the heartbeat message may include the last time that control device heard from the newly determined master. If the newly determined master is not in that control device's peer list (e.g., it timed out), then the heartbeat message may indicate so. In this embodiment, if no peers in the list have a master, then the control device may select the most recent peer (e.g., non-master control device) from which it received a message as the new master and may create a heartbeat message accordingly.

Variations are possible regarding the election of a new master control device (block 450) (e.g., determining the highest rank control device). For example, the election (block 450) may be started by the first non-master control device to determine that the master control device is unavailable, and that first non-master control device may nominate, as the new master control device, the non-master control device that most recently responded to the first non-master. As part of the election, the first non-master control device may send a heartbeat message informing the nominated master control devices of its nomination. The nominated master control device may reject the nomination if its master control device has not timed out, e.g., the nominated master control device believes that its master control device is still available. The nominated master may indicate the rejection of the nomination to the first control device my sending a message, which may include the network address of its master control device. On the other hand, if the nominated master determines that its master control device has also timed out, e.g., is unavailable, then it may accept the election and may remove its control lock (e.g., lockfile). In effect it is usually the last system to timeout that actually elects the new master system. In this embodiment, if a master-less control device (e.g., the control device believes that the master control device timed out) receives a heartbeat message from a peer, and the peer indicates it has a master, then the control device may be updated to indicate the same master as the peer (which may be the control device itself or another peer, for example).

In one embodiment, only one of the control devices may be the master control device. In this embodiment, therefore, a conflict may arise if two different control devices each indicate a different master control device. Such conflicts may be resolved by the following rules (e.g., ranking rules) when a control device (the receiving device) receives a heartbeat message from a peer (any other control device) with master control device information: (1) if the receiving device indicates that the peer is the master, and the peer indicates that the receiving device is the master, then the receiving device may be updated to indicate that the receiving device is the master; (2) if the receiving device indicates that the peer is the master, and the peer indicates that a different master (other than the peer or receiving device), then the receiving device may be updated to indicate the same master as the peer; (3) if the peer indicates that the receiving device is the master, and the receiving device indicates a different master (other than the peer and receiving device), then the peer may be updated to indicate the master indicated by the receiving device; (4) if the peer indicates that the peer is the master, and the receiving device indicates that the receiving device is the master, then the receiving device may be updated to indicate that the peer is the master; (5) if the receiving device indicates that the receiving device is the master, and the peer indicates a different master (other than peer and receiving device), then the peer may be updated to indicate that the receiving device is the master; (6) if the receiving device does not indicate that the receiving device is the master, and the peer indicates that the peer is the master, then the receiving device may be updated to indicate that the peer is the master; (7) if the receiving device does not indicate that the receiving device is the master, and the peer indicates a different master (other than the peer and the receiving device) and the peer indicates that the master is unavailable, then the receiving device may ignore the heartbeat message and not be updated; (8) if the both peer and the receiving device indicate a different master (other than the peer and the receiving device), then either the peer or the receiving device may be updated to indicate that the control device (of the two indicated as masters) that most recently indicated availability to be the master.

If any of these rules apply, and the receiving device is updated to indicate a different master, and that master is not in the receiving device's list of control devices (peers), then the control device may send a message (e.g., a heartbeat message) to the newly indicated master to determine availability. If the receiving device is updated to indicate that the receiving device is the master, then the receiving device may unlock its control functions (e.g., delete the lock file) and begin operating as a master control device, as described below. If the receiving device is updated to indicate that the receiving device is no longer the master device, then the receiving device may stop its control functions (e.g., delete the control process running in the CPU). In this embodiment, the lock file written during execution of control process (as described below) may identify the process to delete.

Figure 6A:
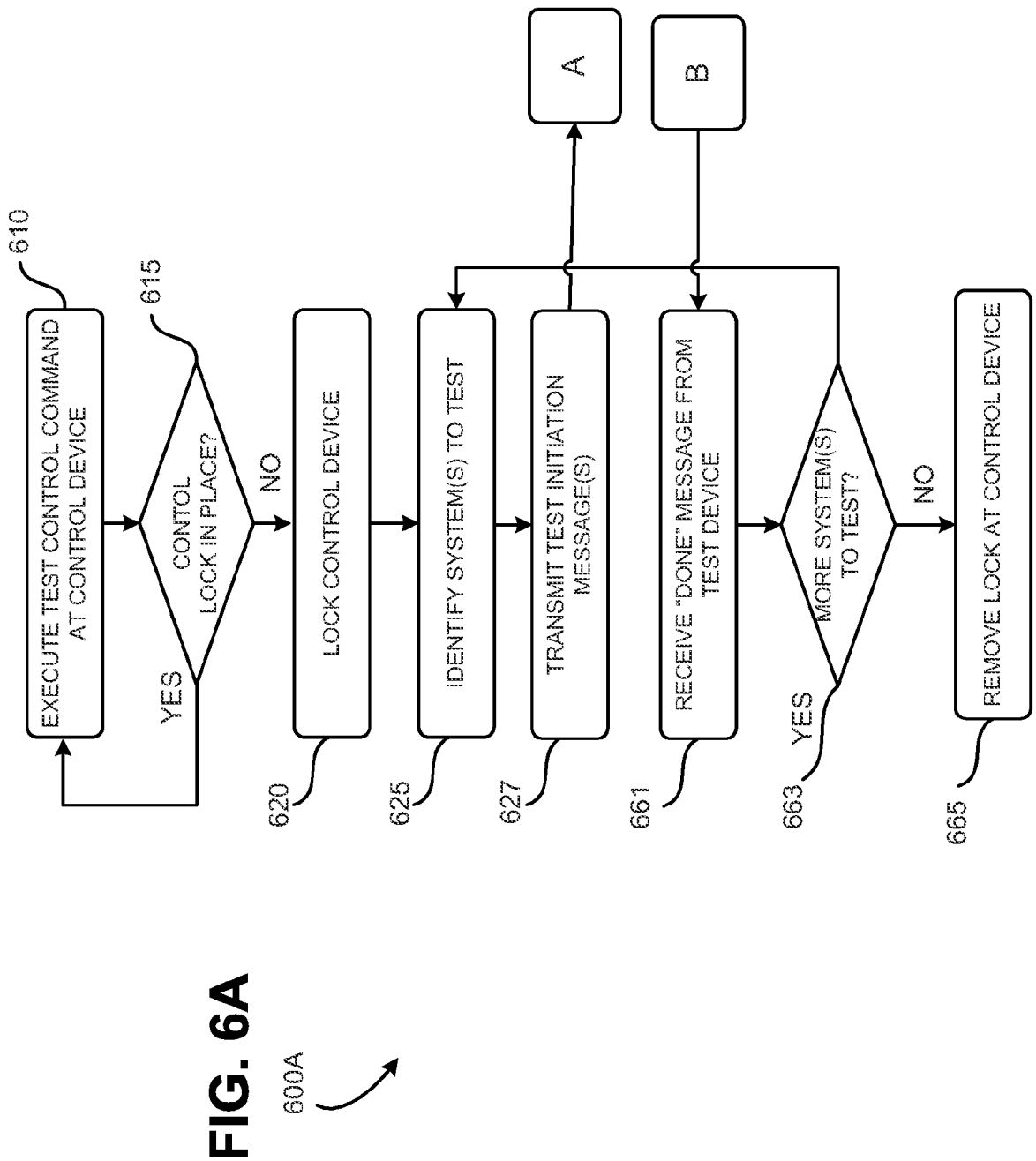

FIGS. 6A through 6C are flowcharts of an exemplary process 600 for testing a data network. Process 600 includes process 600A (shown in FIG. 6A), process 600B (shown in FIG. 6B), and process 600C (shown in FIG. 6C). Process 600A may be performed by a control device, while processes 600B and 600C may be performed by test devices. For simplicity when describing process 600, network device 310 is considered the master control device (also referred to as "master control device 310") and network devices 330-360 are considered test devices. Process 600 is described in conjunction with FIGS. 7A through 7D, which are diagrams of exemplary network signals.

Process 600A may be executed in each control device, whether a master control device or a non-master control device. Process 600A may begin with the control device executing a test control command (block 610). Upon execution of the test control command, the control device may determine whether a lock is in place that inhibits execution of test operations (block 615). As described above, a lock file may be used to inhibit execution of a scheduled test control command. In the current example, master control device 310 does not include a lock to inhibit execution of test operations. Network devices 330 and 340, on the other hand, each include a lock to inhibit test operations because they are not the master control device.

If a lock is in place (block 615-YES), process 600A may return to block 610 at the next testing interval. In the current example, network devices 330 and 340 would each include a control lock file that prevents control operations from executing in those devices.

If, however, a lock is not in place (e.g., if a control lock file does not exist) (block 615-NO), then the control device may proceed to perform the rest of process 600A, starting with block 620. In the current example, master control device 310 does not include a control lock file. As such, master control device 310 may perform the rest of process 600A, starting with block 620.

At block 620, the control device may be locked (block 620) to prevent another control process operating in the same control device from also performing control operations. For example, a lock file similar to the lock file described above with respect to FIG. 4 may be written to the file structure of master control device 310. In this embodiment, attempts to execute additional control operations prior to completion of current tests may be prevented.

One or more systems (e.g., pairs of network devices and corresponding network connections) may be identified for testing (block 625). For example, master control device 310 may identify the system including network device 330, network device 340, and the corresponding connections of network 380 between these two devices for testing. In this case, network devices 330 and 340 may be used to inject and/or receive test data into/from network 380. In one embodiment, however, not all network devices 310-360 may be tested simultaneously for various reasons. For example, it may be undesirable to test a connection between network device 330 and 360 at the same time that a connection between network device 340 and 360 is being tested. Accordingly, master control device 310 may be configured to determine which systems to test during any one testing interval.

In one implementation, master control device 310 may repeatedly and sequentially initiate testing between various network devices while avoiding initiating simultaneous tests that would interfere with each other (e.g., initiating two tests originating or terminating at the same network device). Using network 300 in FIG. 3 above, master control device 310 may be configured to initiate testing between network devices 330 and 340 and testing between network devices 350 and 360 during a first testing interval. Subsequently, during a second test interval, control device 310 may be configured to initiate testing between network devices 330 and 350 and testing between network devices 340 and 360. Accordingly, in one embodiment, no single network device may undergo multiple tests at the same time. In another embodiment, a single network device may undergo multiple tests at the same time when, for example, the network device has multiple interfaces with different queues or buffers and/or the processor associated with the multiple interfaces (or buffers/queues) is not taxed by the multiple tests (e.g., performing the tests at the same time would result in different results than performing the tests sequentially). In one embodiment, no interface may undergo multiple tests at the same time. In yet another embodiment, no group of interface may undergo multiple tests at the same time when that group shares a buffer or queue. These embodiments may improve the accuracy of resulting test data.

In one implementation, master control device 310 may identify systems to test based on a predetermined test schedule. The test schedule may be based on statistics relating to the frequency with which systems have previously been tested or may be based on specific requests, e.g., from a system user or administrator.

Figure 7A:
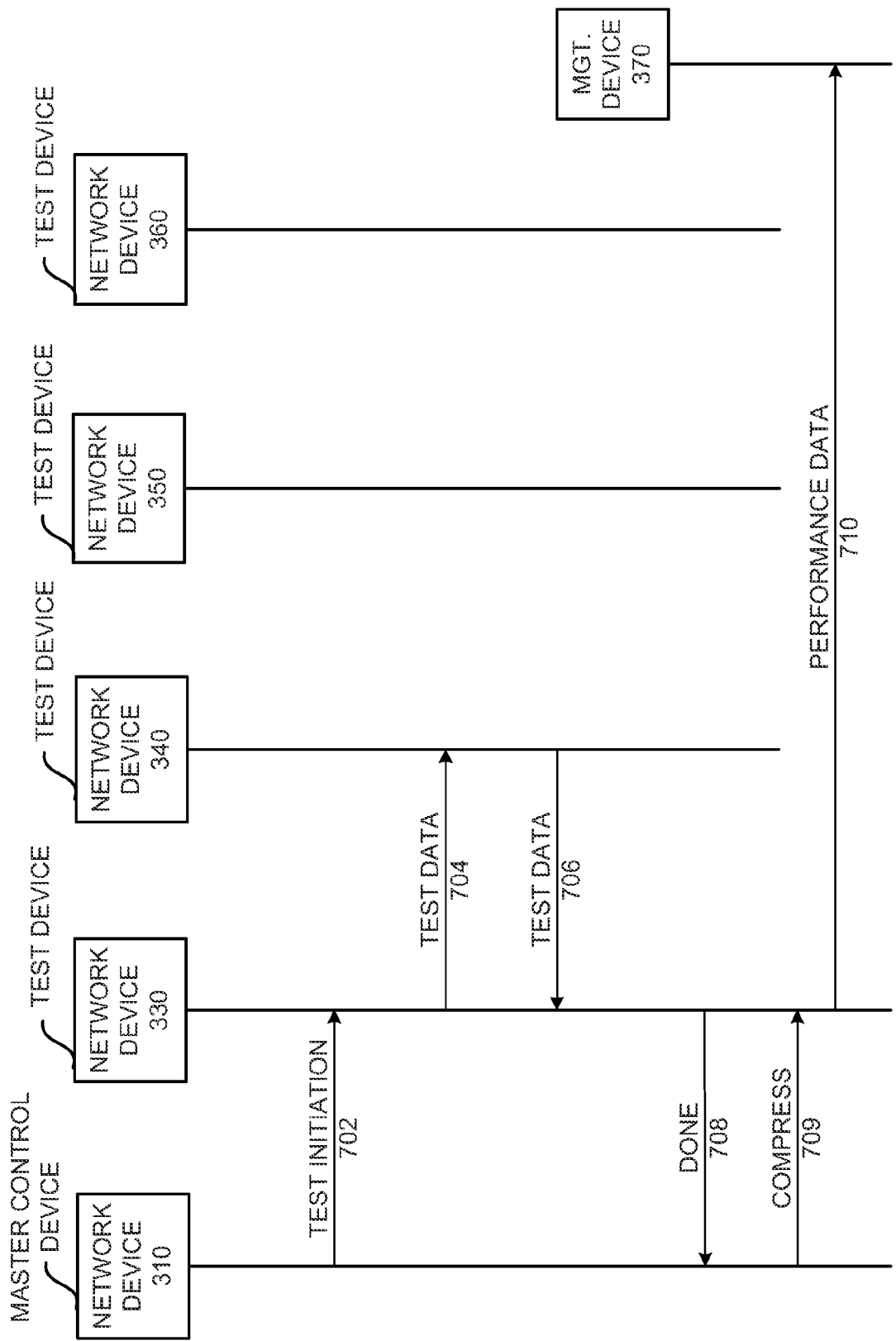

One or more messages for initiating tests may be transmitted to the network devices included in the identified system(s) (block 627). For example, if master control device 310 has identified the system including network device 330 and 340, control device 310 may transmit a test initiation message (signal 702 in FIG. 7A) to one of network devices 330 or 340. In one implementation, the test initiation messages may be transmitted via a network other than the network under test (e.g., an out-of-band network), so as to avoid interfering with network traffic and any other tests currently underway. Although more than one test initiation message may be sent to more than one pair of test devices, FIG. 7A shows only one test initiation message for simplicity.

Master control device 310 may arbitrarily select one of the two network devices 330 or 340 to send the test initiation message. In another implementation, however, master control device 310 may select the network device 330 or 340 based on the historical latency between master control device 310 and network devices 330 and 340. In other words, master control device 310 may transmit the test initiation message (signal 702) to the network device having the lowest latency, which may result in more a rapid delivery of the test initiation message (signal 702). In other implementations, the determination of which of the network devices to transmit the test initiation message to may be based on other criteria, such as the physical distance relative to the control device, or network addresses (e.g., IP addresses) associated with the network devices.

The test initiation message (signal 702) may include information instructing the receiving network device (network device 330) to initiate a network test of its connection to an identified second network device in the system (network device 340). As described above, systems under test may include network devices connected together via virtual local area networks (VLANs) utilizing sub-interfaces on each network device. For example, network 300 of FIG. 3 may include four network devices to be tested (network devices 330-360). Each of network devices 330-360 may include a connection to one or more of the other network devices 330-360, via a specific VLAN/sub-interface (e.g., a virtual wire), for example.

Network device 330 may, for example, include a first sub-interface for connecting to a first sub-interface on network device 340, a second sub-interface for connecting to a first sub-interface on network device 350, and a third sub-interface for connecting to a first sub-interface on network device 360. In one embodiment, each sub-interface may be assigned a /30 subnet address corresponding to a loopback address associated with the respective network device. Although not depicted in FIG. 3, network 300 may include routers or other devices for establishing and managing the VLAN connections, with the result being that a network device may specify the connection to another network device by the VLAN/sub-interface of the other network device.

Referring to process 600B FIG. 6B, a network device may receive the test initiation message and retrieve destination information (block 630). In one embodiment, process 600B may be performed in each pair of test devices (e.g., for each system) that receives a test initiation message from block 627. As described above, each test initiation message may include a network address (e.g., an IP address) or other identifier associated with the second device in the system to be tested (network device 340). A test initiation message may also include the type of test to perform (e.g., packet loss, latency, jitter, reorder, MOS, etc.). Using the example described above, a test initiation message (signal 702) sent to network device 330 may include an identifier (e.g., a VLAN and /30 subnet address) associated with network device 340. The test initiation message may also include quality of service (QoS) parameters for the test (e.g., IP ToS/DSCP bit (Type of Service/Differential Service Code Point) values, VLAN P bit (Class of Service (CoS) and/or Quality of Service (QoS)) values for 802.1p, QoS name, etc.).

The network device receiving the test initiation messages may generate and transmit test data to the other network device in the system being tested (block 635). For example, network device 330 may, based on the received test initiation message (signal 702), generate test data (e.g., signal 704) and transmit the test data to network device 340 via network 380 (e.g., via the VLAN connection established between network device 330 and network device 340). In one implementation, the generated test data (signal 704) may include a user datagram protocol (UDP) stream of packets that include source and destination information as well as timestamp information relating to the time at which each packet is sent.

In one exemplary implementation, the UDP data stream may include a 500 kilobits per second (kbps) stream of 500 packets or datagrams, with each packet or datagram including the above-identified information. To facilitate use of the timestamp information, each network device may periodically synchronize with a time server (e.g., a network time protocol (NTP) server) or another suitable time synchronization entity, thereby providing each network device with ability to determine delay and jitter associated with the received data. In one embodiment, although the network devices may synchronize clocks with an NTP server, errors in clocks between two network devices may be minimized (e.g., effectively be canceled) when a round-trip time is determined between the two network devices.

In response to receiving the test data from the first network device in the system under test, the receiving network device may calculate test performance values based on the received test data (block 640). For example, network device 340 may receive the test data (signal 704) from network device 330 and may calculate the transmission delay through network 380 based on the time stamp in the test data and the current time. The receiving network device may then generate and transmit return test data to the first network device in the system being tested (block 645). In the current example, network device 340 may send test data (signal 706) to network device 330. The return test data (signal 706) may include data similar to the first test data (e.g., in block 635). In one embodiment, the return test data (signal 706) may also include information relating to the test performance values calculated by the receiving network devices.

In response to receiving the return test data from the second network device in the system under test (network device 340), the first network device (network device 330) may calculate test performance values (e.g., latency) based on the received test data (block 650). Because the return test data (signal 706) may be configured to include the performance results from the first direction of the test (e.g., the outgoing direction), the first network device may be in possession of the performance data for both directions of the test. This combined test data may be stored, e.g., in a local storage, such as memory 230 (block 655).

In response to receiving the return test data, the first network device may transmit a message to the control device indicating completion of the test (block 660). The control device may receive the "done" message (block 661). For example, network device 330 may transmit a "done" message (signal 708) to control device 310. As many "done" messages may be sent to the master control device as initiation messages sent from the master control device. In one embodiment, rules may be established at the first network device to monitor the collected performance data and to transmit alerts or other notifications upon the occurrence of criteria (e.g., a threshold for latency, jitter, packet loss, MOS, reorder, etc.). The criteria may be based on historical measurements or may be configured values. An alert may include a syslog (system log file), SNMP (Simple Network Management Protocol) traps, e-mail messages, etc. Such alerts may be sent to system administrators or customers, for example. Alternatively, the collected data may be accessible via a web-based or application front-end for enabling queries for particular types of information.

Figure 7B:
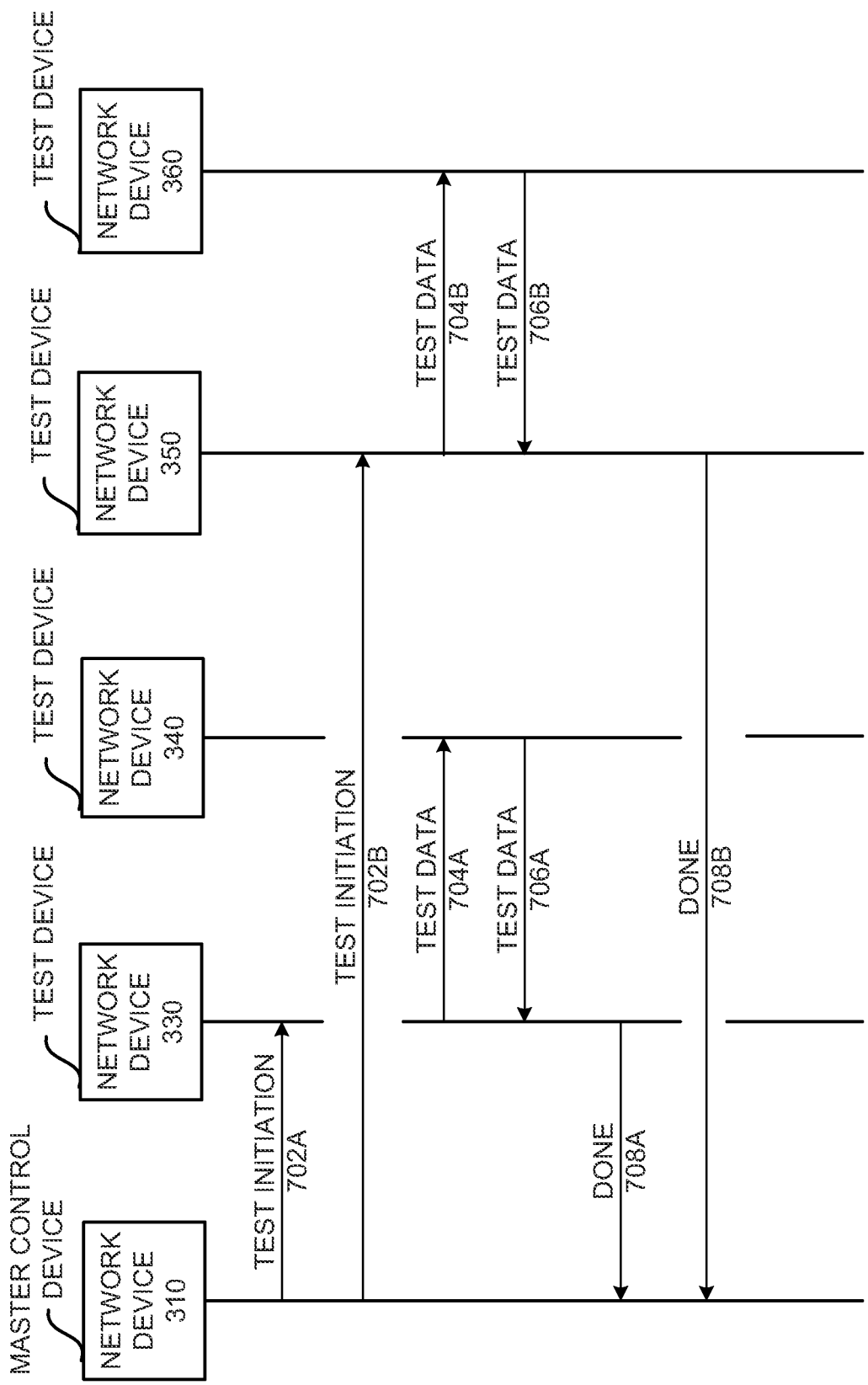
Figure 7D:
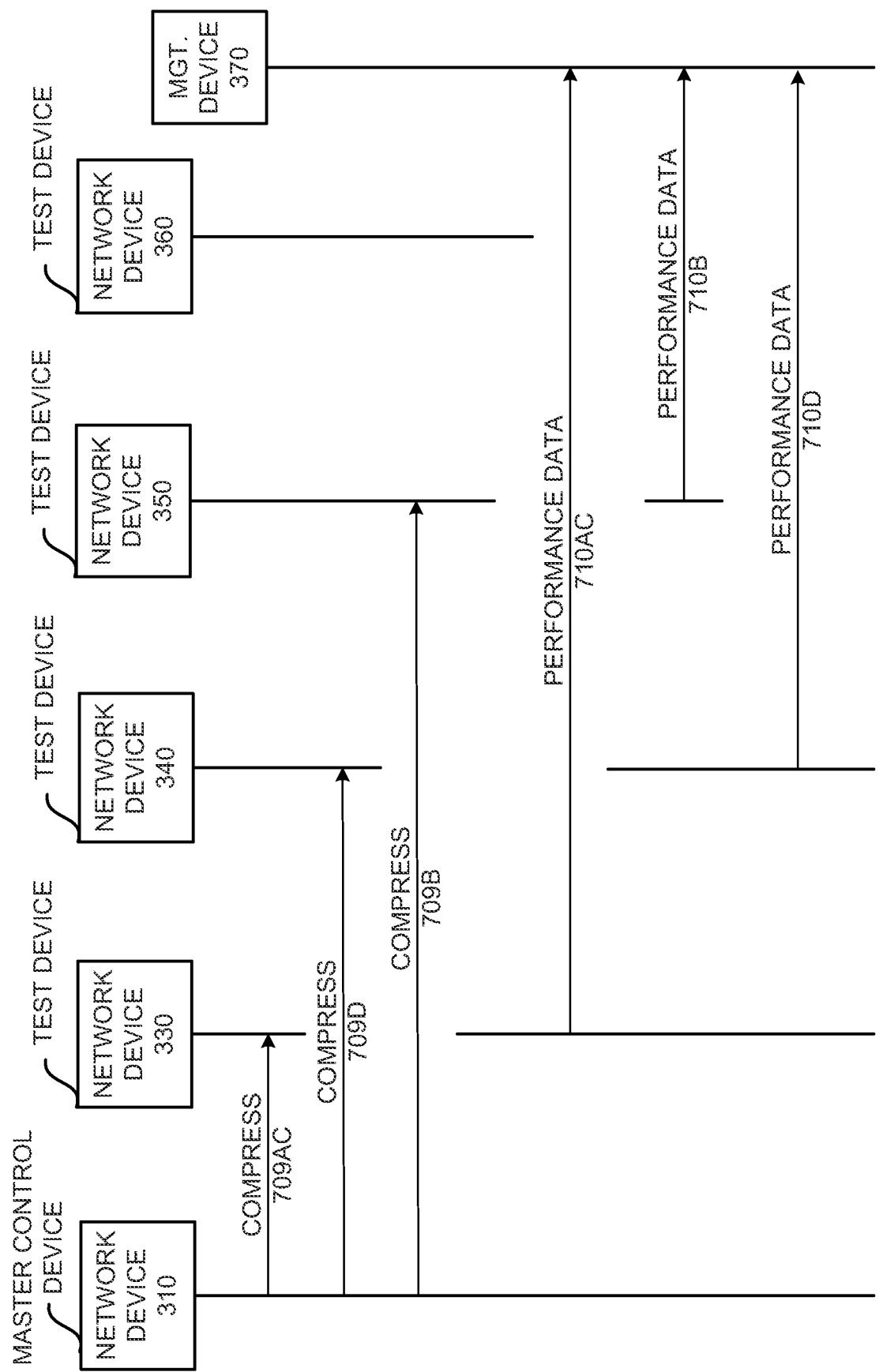

If there are more system(s) to test (block 663-YES), process 600A may return to block 625 to identify any remaining system(s) to test. In the example of FIG. 7B, control device 310 may initially select two pairs of network devices for test (e.g., network devices 330 and 340 as the first pair, and network devices 350 and 360 as the second pair). In this example, therefore, control device 310 may send test initiation messages (signals 702A and 702B) to network devices 330 and 350. After receiving messages from network devices 330 and 350 that the tests have been completed (e.g., signals 708A and 708B), control device 310 may determine that there are more system(s) to test (block 663-YES). Control device 310 may then select two additional pairs of network devices for testing. In the example of FIG. 7C, control device 310 may select network devices 330 and 350 as the third pair, and network devices 340 and 360 as the fourth pair. In this example, therefore, control device 310 may send test initiation messages (signals 702C and 702D) to network devices 330 and 340. After receiving messages from network devices 330 and 340 that the tests have been completed (e.g., signals 708C and 708D), control device 310 may determine that no other pairs of network devices need to be tested (block 663-NO).

If there are no further system(s) to test (block 663-NO), the control device may then remove the lock (e.g., delete the lock file) (block 665). Deleting the lock file may allow execution of the controller command (block 610) at a next test interval. A test interval may be 1 minute, 5 minutes, 10 minutes, 15 minutes, 30 minutes, or an hour, for example. In another embodiment, process 600 may run continuously where testing would start again after all the tests have been completed.

Variations to process 600A and 600B are possible. For example, process 600A may allow a system administrator to manually command tests for network devices and to send instructions to network devices. For example, a system administrator may send, to a network device, any type of test command, an AYT (Are You There) command, a Compress command (e.g., similar to signal 709D), a Debug/Undebug command, a Restart Server command, a Reboot System command, an Alert Generation command, a Kill/Stop Tests command).

Further, additional steps may be taken that may prevent multiple interfering tests from being performed at the same time. For example, master control device 310 may send a lock message to both network devices in the system under test prior to initiating the test. An acknowledgement message sent by both network devices to master control device 310 may confirm that both network devices are available for the test, or may indicate that one or both network devices are busy (e.g., with another test). After receiving the lock message from master control device 310, and if the network device is available to perform the test, the network device may lock itself from additional conflicting tests, e.g., write a lock file to its file structure so that any other conflicting requests for tests may be denied. In this example, the lock file may be specific to a particular interface, to a group of interfaces sharing a buffer/queue, or to the network device as a whole, for example. After completing the test, master control device 310 may send an unlock message to both network devices in the system tested.

In another embodiment, master control device 310 may send an availability query message to the first network device in the system under test. If not available, the first network device may respond to master control device 310 indicating it is busy. If available, the first network device may then send a lock message to the second network device in the system under test to confirm that the second network device is available. If the second network device is unavailable then a busy message may be returned to master control device 310. If the second network device is available, then the second network device may respond to master control device 310 with an acknowledgement message and may lock itself from additional conflicting tests, e.g., write a lock file to its file structure. In this example, the lock file may be specific to a particular interface, a group of interfaces sharing a buffer/queue, or to the network device as a whole, for example. If both network devices are available, the test may execute, and an unlock message may be sent to the second network device (e.g., by the first network device or by master control device 310) upon completion of the test so that the second network device may unlock itself for additional tests. In addition, the first network device may send a "done" message to master control device 310. In this embodiment, the first network device may also lock itself from performing additional conflicting tests if it is available.

FIG. 6C is a flowchart of an exemplary process 600C for reporting test data. In one embodiment, each network device may execute process 600C. Process 600C may begin with a network device executing a data transfer command (block 670). A network device may attempt to execute the data transfer command periodically using, for example, the "crontab" command discussed above. Upon execution of data transfer command, a network device may determine whether a data transfer lock is in place (block 675) that inhibits reporting of test results. For example, a lock file may be used to inhibit the start of a data transfer process while another data transfer process is currently taking place.

If a data reporting lock is not in place (block 675-NO), processing may return to block 670 for execution of the next data transfer command. If there is no data transfer lock in place (block 670-YES), collected performance data may be transmitted from the network device to another device (block 675). In one implementation, the collected performance data may be transmitted out-of-band (e.g., over a network different from the network under test, such as an internal data network associated with a network administrator or service provider of network 380). In another embodiment, the performance data may be compressed before transmission. In this embodiment, the network device may wait to receive a "compress" and "rename" command, which may be periodically sent from the master control device. After receiving this command, the network device may compress and rename the file having the performance data, whereby process 600C periodically sends the compressed file to management device 170, for example.

In the example of FIG. 7A, network device 330 may receive a compress message (signal 709) from master control device 310 and, in response, may compress and rename the file having the performance data. Network device 330 may, some time thereafter, transmit the compressed performance data (signal 710) file to management device 370.

In the example of FIGS. 7B and 7C, network device 330 may receive a compress message (signal 709AC) from master control device 310 and, in response, may compress and rename the file having the performance data. Network device 330 may, some time thereafter, transmit the compressed performance data (signal 710AC in FIG. 7D) to management device 370. In this example, network device 350 may receive a compress message (signal 709B) and, in response, may compress and rename the file having the performance data. Network device 350 may, some time thereafter, send the compressed performance data (signal 710B in FIG. 7D) to management device 370.

In one embodiment, network devices 330-360 may connect (e.g., using a secure tunnel) to the database in management device 370 directly to update the database rather than transmitting a data file.

Performance data received from the network devices may be stored, e.g., in a database or other data structure at management device 370 (block 685). Requested portions of the collected data may be provided to network operators or customers (block 690). For example, in one implementation, rules may be established at management device 370 to monitor the collected performance data and to transmit alerts or other notifications upon the occurrence of predetermined criteria (e.g., a predetermined or threshold latency, jitter, packet loss, MOS, reorder, etc.). An alert may include a syslog, SNMP (Simple Network Management Protocol) traps, e-mail messages, etc. Alternatively, the collected data may be accessible via a web-based or application front-end for enabling queries for particular types of information.

By providing redundant control and efficient test scheduling, systems and networks described herein may efficiently test a data network.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, acknowledgement (ACK) messages may be sent in response to all received non-acknowledgement messages.

For example, features have been mainly described above with respect to control devices, network devices, and management devices. In other implementations, features described herein may be consolidated into fewer devices, or distributed among additional devices. For example, the control devices may each include network devices under test and may also store and provide their own performance data, rather than offloading the data to a remote location.

Further, while series of acts have been described with respect to FIGS. 4, 6A, and 6B, the order of the acts may be varied in other implementations. Moreover, non-dependent acts may be implemented in parallel.

It will also be apparent that features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, at a first interface of a first network device of a first system under test, a test initiation message sent from a control device, wherein the first interface of the first network device is selected to receive the test initiation message and not a second interface, of the first network device, of another system concurrently under test based on a determination that:
        different queues or different buffers are associated with each of the first interface and the second interface, and
        results obtained from the first system under test concurrently with the other system under test do not vary from results in which the first system under test and the other system under test are in sequence;
    generating, by the first network device, first test data including at least source information associated with the first network device, destination information associated with the second network device, and timestamp information associated with the first test data;
    transmitting, by the first network device, the first test data to the second network device via a data network of the first system under test;
    receiving, at the first network device, second test data from the second network device, wherein the second test data includes first testing results calculated by the second network device based on the first test data;
    calculating, by the first network device, second testing results based on the second test data;
    generating, by the first network device, collective performance information based on the first testing results and the second testing results;
    storing, at the first network device, the collective performance information; and
    periodically transmitting, from the first network device, the stored collective performance information, via a second data network that is not included in the first system under test, to a storage device that is not included in the first system under test.

2. The method of claim 1, wherein the control device comprises one of a redundant set of eligible control devices.

3. The method of claim 1, wherein the first test data includes a stream of user datagram protocol (UDP) datagrams.

4. The method of claim 1, wherein the data network comprises a private data network connection between the first network device and the second network device.

5. The method of claim 4, wherein the private data network connection comprises a virtual local area network (VLAN) connection.

6. The method of claim 1, further comprising:
    transmitting, by the first network device, a first message to the control device upon receipt of the second test data, the first message notifying the control device that the test is complete; and transmitting, by the first network device, an unlock message to the second network device.

7. A system, comprising:

a set of control devices, including a master control device and a plurality of non-master control devices; and a plurality of test devices interconnected via a network under test, wherein the set of control devices is configured to:

periodically determine a status of at least some of the control devices;

determine whether the master control device has an available status; and identify a new master control device from the plurality of non-master control devices when the master control device does not have an available status, and wherein the plurality of test devices include a first network device configured to:

receive a test initiation message from the master control device, wherein the test initiation message includes at least an identification of a second network device, of the plurality of test devices, to include in a test;

initiate, upon receipt of the test initiation message, a processing lock to prevent execution of processing operations, unrelated to the test, via a particular interface of the first network device and via each of one or more interfaces of the first network device that share a buffer or a queue with the particular interface;

generate outgoing test data including at least source information associated with the first network device, destination information associated with the second network device, and timestamp information associated with the outgoing test data;

transmit, via the particular interface, the outgoing test data to the second network device via the network under test, wherein the one or more interfaces are not used to transmit the outgoing test data;

receive, via the particular interface and not via the one or more interfaces, return test data from the second network device, wherein the return test data includes first testing results calculated by the second network device based on the outgoing test data;

calculate bidirectional performance information based on the return test data, including the first testing results, received from the second network device;

send, upon completion of the test, a status message to the master control device indicative of the completion of the test;

receive, responsive to the status message, an unlock message from the master control device; and remove at the particular interface and at the one or more interfaces, the processing lock based on the unlock message.

8. The system of claim 7, wherein the set of control devices are further configured to receive status messages from each other of the set of control devices, wherein receipt of a status message indicates that the control device sending the status message has an available status.

9. The system of claim 7, wherein the non-master control devices in the set of control devices are configured to:

determine whether a status message has been received from the master control device; and lock execution of controller processing when the status message has been received from the master control device.

10. The system of claim 9, wherein the non-master control devices in the set of control devices are configured to:

determine, at each non-master controller receiving status messages, whether the non-master control device is ranked higher than the non-master controllers from which status messages have been received when the status message has not been received from a current master control device;

lock execution of controller processing for non-master control devices not ranked higher than the non-master control devices from which status messages have been received; and unlock execution of controller processing for a non-master control device ranked higher than the non-master control devices from which status messages have been received.

11. The system of claim 7, wherein the set of redundant control devices comprises three control devices.

12. The system of claim 7, wherein the set of control devices are further configured to:

execute a test control command;

determine whether execution of controller processing is locked; and return to an idle state for a next test interval when it is determined that the execution of controller processing is locked.

13. The system of claim 7, wherein the master control device is further configured to:

identify a set of test devices to test from among the plurality of test devices, where each set of test devices includes an initiating test device and a receiving test device;

generate test initiation messages designating at least the initiating test device and a receiving test device for each test; and transmit the test initiation messages to the initiating test devices.

* * * * *